United States Patent [19]

Pelischek

[11] Patent Number: 4,615,637

[45] Date of Patent: Oct. 7, 1986

[54] FOLDABLE SELF-ERECTING JOINT

[75] Inventor: Timothy E. Pelischek, Houston, Tex.

[73] Assignee: The United States of America as represented by the Administrator of the National Aeronautics and Space Administration, Washington, D.C.

[21] Appl. No.: 588,039

[22] Filed: Mar. 9, 1984

[51] Int. Cl.$^4$ .......................................... F16C 11/04
[52] U.S. Cl. ...................................... 403/85; 403/102; 403/119; 403/146; 403/163; 16/294; 16/370
[58] Field of Search ............. 403/85, 102, 120, 146, 403/119, 161, 163, 113; 16/294, 295, 302, 366, 370, 291

[56] References Cited

U.S. PATENT DOCUMENTS

| | | | |
|---|---|---|---|
| 2,359,554 | 10/1944 | Griswold | 403/102 |
| 2,363,667 | 11/1944 | Griswold | 403/102 |
| 3,187,373 | 6/1965 | Fisher | 16/329 |
| 3,563,592 | 2/1971 | Preston | 403/102 |
| 3,611,474 | 10/1969 | Meyer | 16/370 X |
| 4,131,378 | 12/1978 | Daws | 16/294 X |
| 4,342,367 | 8/1982 | Gates | 403/119 X |
| 4,365,908 | 12/1982 | Thiboutot | 403/102 |
| 4,389,748 | 6/1983 | Grossman | 16/302 X |
| 4,393,541 | 7/1983 | Hujsak et al. | 403/102 X |
| 4,532,674 | 8/1985 | Tobay et al. | 16/295 |
| 4,558,967 | 12/1985 | Craighead, II et al. | 403/113 |

Primary Examiner—Cornelius J. Husar
Assistant Examiner—Joseph A. Fischetti
Attorney, Agent, or Firm—Russell E. Schlorff; John R. Manning; Marvin F. Matthews

[57] ABSTRACT

A self-erecting joint for a pair of hinged, tubular members in which the hinging is located at corresponding portions of the members and the opposite edge portions are connected by spring-biased toggle links which in the unfolded position of the members are nested against one of the members in substantial alignment and over-center for securely locking the joint in the unfolded condition.

11 Claims, 6 Drawing Figures

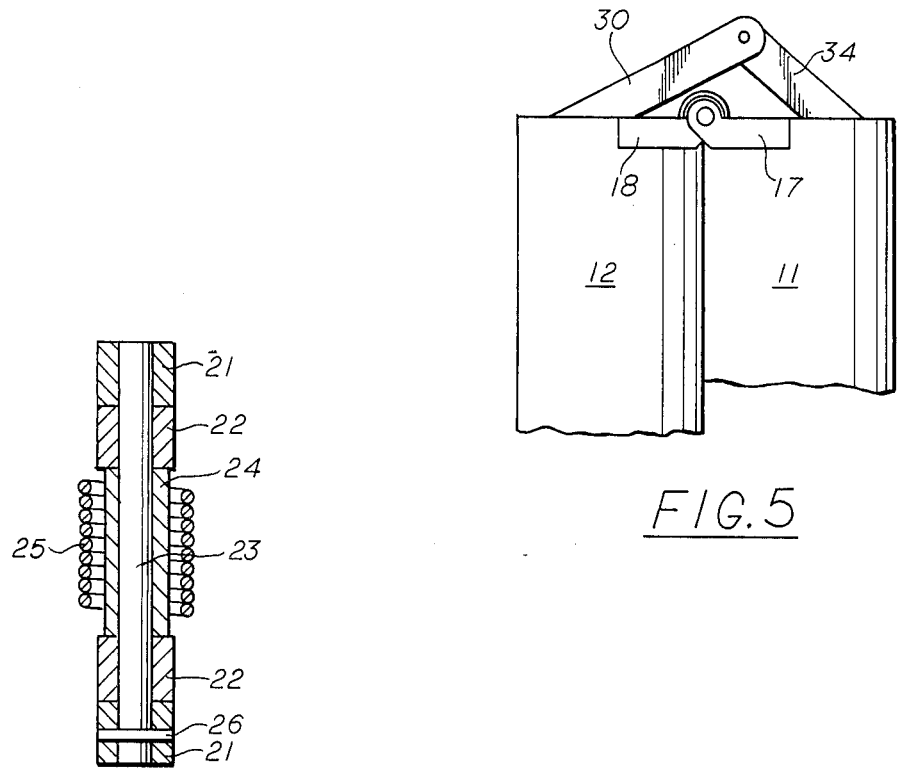
FIG. 4
FIG. 5
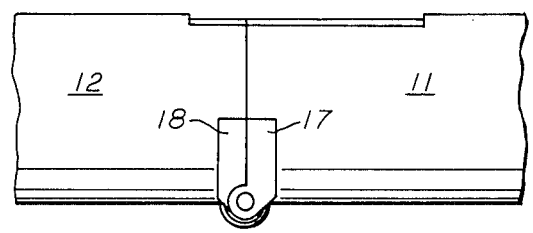
FIG. 6

FOLDABLE SELF-ERECTING JOINT

ORIGIN

The invention described herein was made by an employee of the United States Government and may be manufactured and used for the government of the United States of America for governmental purposes without the payment of any royalties thereon.

FIELD OF THE INVENTION

The invention relates to hinge-jointed structures of the type which may be self-deployed from a compactly folded configuration.

BACKGROUND OF THE INVENTION

A co-pending application entitled, "Shuttle Launched Triangular Space Station," Ser. No. 587,764, filed Mar. 9, 1984, and assigned to the assignee of the present application, discloses a space station constructed of triangular panels each made up of a multiplicity of collapsible and expandable modules called tetratrusses. The modules consist of a multiplicity of struts pivotally connected, certain ones of which have central hinged joints disposed so that the modules can all be collapsed into a compact bundle which can be stowed, for instance, in the payload bay of the space shuttle orbiter. The hinged joints are spring-biased so as to make the space station truss self-erecting. The hinged joints must rigidly lock the struts in coaxial alignment in the deployed position. None of the prior art has been found to be completely satisfactory for this purpose.

For instance, U.S. Pat. No. 4,365,908, to Thiboutot, discloses a spring-biased folding joint for interconnecting elongated members. The joint automatically locks in folded and expanded configurations. However, the design is very complicated and bulky and structurally weak.

Preston U.S. Pat. No. 3,563,592 discloses a lockable folding brace system including a sliding sleeve to which is attached a coiled tension spring. However, the design does not permit two tubes to lie compactly side-by-side when folded, and is not self-expanding.

Fisher U.S. Pat. No. 3,187,373 discloses a spring-loaded locking hinge mechanism which arrangement does not incorporate self-expanding springs and incorporates a spring-loaded latch instead of a four-bar linkage, as in the present invention.

SUMMARY OF THE INVENTION

An object of the present invention is to provide a self-deployable, hinged joint particularly adaptable for use in the tetratruss modules utilized in the space station as described in the above-mentioned pending application.

Another object is to provide a spring-biased, hinged joint which may be safely locked in the expanded configuration and which is free of large interfering projections in that position.

Another object is to design a self-erecting joint as described in the above-mentioned co-pending application which cannot be released from the locked position by bending moments applied thereto.

Still another object is to construct a self-erecting joint of the above type in which buckling or initial crookedness in the attached structure cannot unlock the joint.

The hinged joint as disclosed is incorporated in the tetratuss, as explained in the mentioned co-pending application, utilizing hollow rods or struts pivotally connected. However, the invention is capable of broader utility.

The novel joint, in accordance with the invention, has mating hinge parts rigidly secured to the hinged structure, e.g., the lower edge parts of confronting ends of certain of the rod members. Adjacent corners of the rod members are hinged together so that the hinged rod parts may lie compactly in side-by-side relationship when collapsed and will be aligned when deployed. Pivotally connected to the opposite edge portions of the rod parts are the distal ends of toggle links which are centrally joined pivotally, in effect, forming a four-bar over-center linkage. In the collapsed condition of the device, the hinge is opened and the toggle links are broken outwardly.

As the hinge closes to align the rod parts, the toggle links are rotated to centered or slightly over-center positions to be substantially flush with one of the rod parts. Torsion springs are received about the hinge pin and one of the toggle link pins to bias the links and attached parts into a locked, expanded condition and maintain the joint securely locked. To increase the energy available to deploy the tetratruss, additional springs may be added to the joint.

BRIEF DESCRIPTION OF THE DRAWINGS

In the accompanyings drawings,

FIG. 4 is a section taken on line 4—4 of FIG. 2.

FIGS. 5 and 6 are, respectively, schematic views of the joint in fully open and fully closed positions.

DETAILED DESCRIPTION OF THE DRAWINGS

Figure 1:
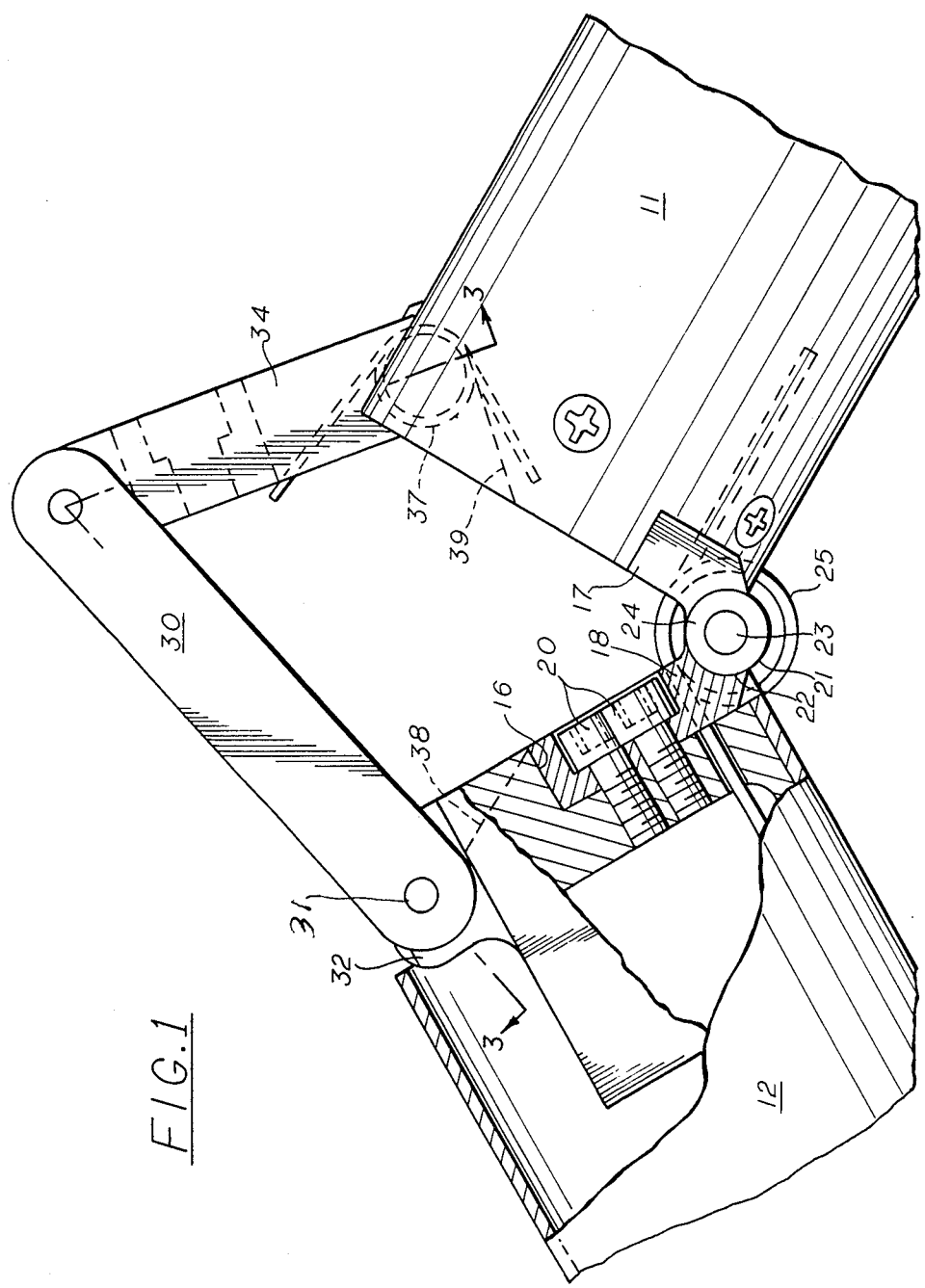
FIG. 1 is a side view of the novel joint with the hinge partially opened and with parts broken away and sectioned.
Figure 2:
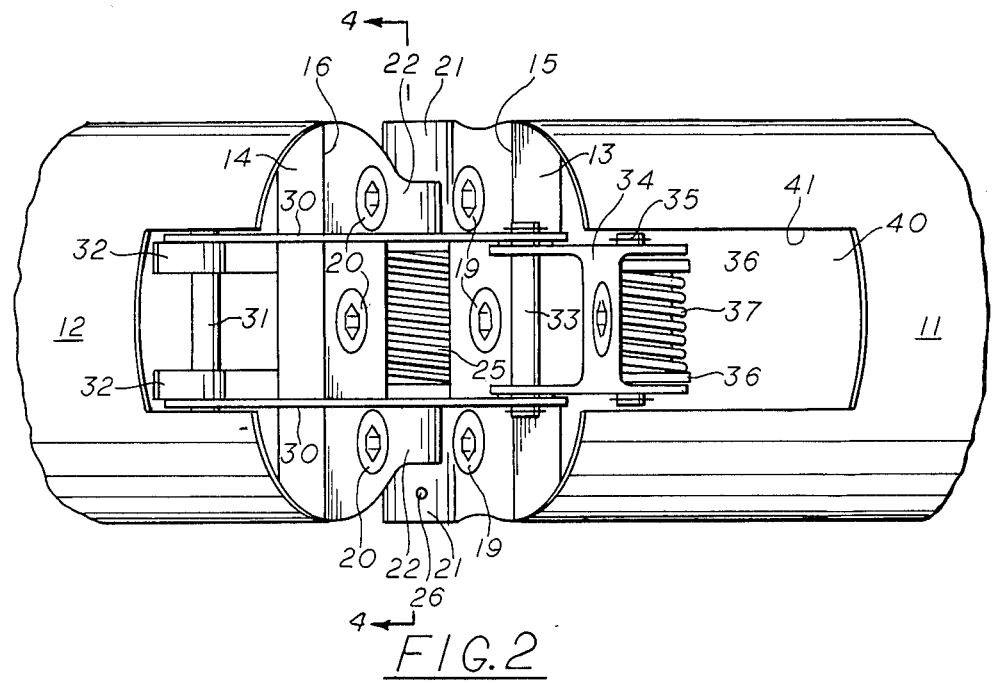
FIG. 2 is a top view of the structure in FIG. 1.
Figure 3:
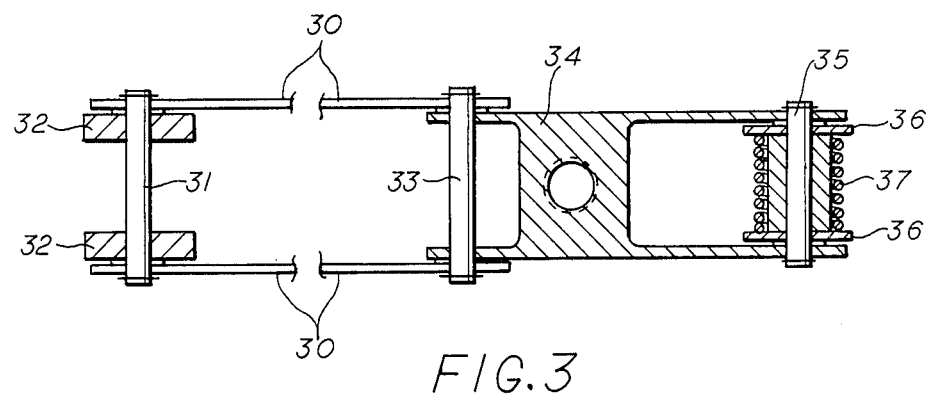
FIG. 3 is a section on broken line 3—3 of FIG. 1.

The figures show the two halves 11 and 12 of one of the tetratruss struts as disclosed in the mentioned co-pending application. Rigidly secured in the confronting ends of the rod halves are cup-like plug or disk members 13 and 14 having lower recesses 15 and 16 in which are secured hinge parts 17 and 18 by means of socket head cap screws 19 and 20. Projecting from the hinge parts, respectively, are the outer and inner hinge eyes 21 and 22 which encompass hinge pin 23. If desired, the disk and hinge can be in one piece and identical so they may be used for either end. The mandrel sleeve 24 surrounds the hinge pin between the eyes and a torsion spring 25 is received about the mandrel. One outer eye is secured to pin 23 by the spring pin 26.

A pair of tension toggle links 30 are connected by a pin 13 to wings 32 at the upper edge of disk plug 14 and are connected at their distal ends by a pin 33 with the bifurcated compression toggle link 34. Link 34 is connected by a pin 35 to wings 36 at the upper edge of disk plug 13. A second torsion spring 37 encompasses pivot pin 35 for biasing link 34 clockwise with respect to rod part 11. Extending along the plug disks in line with the link bifurcations are grooves 38 and 39.

In the fully open (FIG.5) position and the partly open position (FIG. 1) of the hinge, the links project outwardly from the hinge and approach but do not reach overlapping alignment and links 30 are accommodated by grooves 38 in disk plug 14. During closing of the hinge, tension links 30 ultimately overlap links 34 and all are nested in a recess 40 so as to provide the trim upper surface shown in FIG. 6. The links will be maintained over-center by the torsion springs to provide a secure lock for the rod (strut) parts in the deployed condition. In the closed hinge position, (FIG. 6) the nested toggle links are rather snugly seated between side walls 41 of or within the recess as further stabilization thereof.

In operation, the tubular rod halves 11 and 12, in the collapsed position of the rod (FIG. 5), will lie in compact side-by-side position. The toggle links will be broken upwardly sufficiently to facilitate closing of the joint. The entire tetratruss may be stowed in the payload bay of the space shuttle orbiter and the entire package unberthed, released and deployed to provide the structural framework for a space station.

During deployment, the rod halves and links pass through the intermediate position of FIG. 1, link 34 rotating clockwise and link 30 initially counterclockwise, then clockwise as it overlaps link 34. Ultimately, both links nest in recess 40 as stated. If desired, an adjustment screw may be threaded into the body of toggle 34 to provide means for-over center adjustment.

The joint is free of relatively large protrusions on which crew persons or equipment can get snagged. The locking mechanism is secure in the deployed position even under vibration, or in case of bending forces applied to the hinging, or crookedness in the tetratruss. The energy stored in springs provides deployment energy for the tetratruss.

When the rods and tetrattrusses are fully aligned and expanded, the tops of the aligned rod halves will be as smooth as indicated in FIG. 6.

A torsion spring may be applied also to pin 31 to further increase the stability of the joint by providing biasing force to rotate the toggle link over-center. The invention may be applied also to other structures, particularly for space use, as antennas, solar panels, masts, and other structures utilizing folding elements. While for the space station and other space use the hinged joint once expanded need not be refolded, for other operations when refolding is desired, provisions may be made to unlock the joint, such as means to manually rotate the toggle links.

The invention may be modified in various respects as will occur to those skilled in the art and the exclusive use of all modifications as come within the scope of the appended claim is contemplated.

I claim:

1. A self-erecting, hinged joint comprising a pair of members hinged together at one edge for folding action, said hinge including a hinge pin extending entirely across the hinge, a pair of pivoted externally operating toggle links connecting diametrically opposite portions of said members, means to arrest the rotation of the toggle links, and means surrounding said hinge pin biasing said joint to coaxially align said members with the ends in intimate contact and align said links in overlapping relationship against one another in the unfolded position of said joint, thereby securely locking said joint.

2. A self-erecting joint as described in claim 1 in which said members are tubular and further including plug disks secured in confronting hollow ends of said members for attachment of hinges and said toggle links.

3. A self-erecting joint as described in claim 2 further including hinge parts and a hinge pin secured to corresponding edge portions of plug disks opposite to said toggle links.

4. A self-erecting joint as described in claim 3 in which the means for biasing said members includes a torsion spring about said hinge pin.

5. A self-erecting joint as described in claim 4 in which there is a second torsional spring about a hinge pin for the linkage to provide over-center biasing force.

6. A self-erecting joint as described in claim 5 further including recesses in said members for accommodating said toggle links in the unfolded, locked condition within the general contour of said members.

7. A self-erecting joint as described in claim 3 further including means to adjust the over-center movement of the toggle links.

8. A hinge having structural members attached thereto for positioning said structural members from a collapsed, side-by-side position to a deployed, coaxially-aligned position comprising, a pair of D shaped plugs secured in confronting ends of the structural members;

a pair of hinge members pivotally connected together by a hinge pin which extends entirely across the hinge, said hinge members located at the rounded edge of the plugs whereby the structural members lie in a side-by-side relation in the collapsed position;

biasing means surrounding said hinge pin for rotating the structural members from the collapsed position to the deployed position;

locking means located at the flat edge of the plugs diametrically opposite the hinge means maintaining the joint in a securely locked condition, said locking means being formed of a pair of pivoted tension toggle links and a pivoted, biased, bifurcated compression link, the links being pivotally connected together, with, the tension links being longer than the compression link and extending externally of the hinge in the stowed position, the links, together with the confronting ends of the plugs forming an externally folding, four bar linkage whereby in the deployed position the compression link will contact the flat portion of the plug and the links will be in overlapping relationship against one another, and the confronting ends of the plugs in intimate contact forming a securely locked slop-free joint which will withstand axial, bending and torsional structural loads, and recesses in the structural members for accommodating movement of the locking means, the locking means in the aligned unfolded condition being positioned within the general contour of said structural members.

9. The hinge as set fourth in claim 8 in which the biasing means is a torsion spring about said hinge pin.

10. The hinge as set forth in claim 9 including a second torsional spring about the pivot pin of the compression link providing biasing means for the locking means.

11. A self-erecting joint for a pair of hollow tubes, comprising a pair of D shaped plugs secured in confronting ends of the tubes, the plugs having hinge parts which are joined together by a hinge pin extending entirely along the centerline of the joint, a torsion spring surrounding the hinge pin to provide energy to close the hinge and align the tubes, locking means formed of a pair of tension links pivotally attached to the unhinged portion of one of the plugs, a bifurcated compression link pivotally attached to the unhinged portion of the other plug, a pin pivotally attaching together the free ends of the tensions links and the compression link, a torsion spring surrounding the compression link pivot to assure the rotation of the compression link, until such rotation is arrested by the flat portion of the plug to which it is attached, the tension links and the compression link being sized together with the confronting faces to form an externally folding, four-bar, over-center linkage which forces the confronting faces into intimate contact and takes up all looseness providing a securely locked slop-free joint which will withstand axial, bending and torsional structural loads.

* * * * *